United States Patent [19]
Fowlkes et al.

[11] Patent Number: 5,476,369
[45] Date of Patent: Dec. 19, 1995

[54] ROTOR COUNTERWEIGHT INSERT APPARATUS

[75] Inventors: Jeffrey C. Fowlkes, Paris; Gary L. Gilmore, McKenzie, both of Tenn.

[73] Assignee: Tecumseh Products Company, Tecumseh, Mich.

[21] Appl. No.: 279,952

[22] Filed: Jul. 25, 1994

[51] Int. Cl.$^6$ ............... F04B 35/04; F04C 18/04; F04C 29/02; H02K 7/04
[52] U.S. Cl. ............... 417/410.5; 418/55.6; 418/94; 418/151; 74/573 R; 310/51
[58] Field of Search ............... 417/410.5, 410.1, 417/410.3; 418/55.6, 94, 151; 74/573 R; 310/51

[56] References Cited

U.S. PATENT DOCUMENTS

| | | | |
|---|---|---|---|
| 4,762,478 | 8/1988 | Sakurai | 418/55.1 |
| 5,007,810 | 4/1991 | Fraser, Jr. | 417/410 |
| 5,013,226 | 5/1991 | Nishida | 418/55.1 |
| 5,336,060 | 8/1994 | Tomell et al. | 418/151 |

FOREIGN PATENT DOCUMENTS

| | | | |
|---|---|---|---|
| 61-118589 | 6/1986 | Japan. | |
| 62-168976 | 7/1987 | Japan | 418/151 |
| 1681559A1 | 11/1991 | U.S.S.R. | 418/151 |

*Primary Examiner*—John J. Vrablik
*Attorney, Agent, or Firm*—Baker & Daniels

[57] ABSTRACT

A hermetic compressor assembly is disclosed including a motor compressor disposed within a hermetically sealed housing, wherein the housing has an oil sump in the bottom thereof from which oil is drawn to lubricate the compressor mechanism. An electric drive motor includes a vertical rotor having a lower axial end ring with rotor counterweight die cast therein, whereby turbulence and resulting agitation of the oil in the oil sump is prevented during rotation of the rotor. By die casting the counterweight within the end ring additional attachment parts and manufacturing steps are eliminated.

6 Claims, 2 Drawing Sheets

ROTOR COUNTERWEIGHT INSERT APPARATUS

BACKGROUND OF THE INVENTION

The present invention relates generally to hermetic compressors of the type including a motor-compressor unit disposed within a hermetically sealed housing having a rotor with an attached counterweight. More particularly, the invention relates to apparatus for minimizing turbulence within the housing during compressor operation, thereby reducing undesirable agitation of oil in the oil sump.

A common design for a hermetic compressor is to have the electric drive motor in the bottom portion of the housing, adjacent the oil sump, and the compressor mechanism in the top portion of the housing. In such an arrangement, the crankshaft of the compressor mechanism ordinarily is coaxially disposed within the motor rotor and operably engaged thereby. A lower end of the crankshaft extends into the oil sump so that oil can be pumped therefrom, through a passageway in the crankshaft, to the compressor mechanism. The lower axial end of the motor rotor adjacent the oil sump will typically include an axially protruding, arc-shaped weight adapted to counterbalance eccentric rotating masses associated with the compressor mechanism at the opposite end of the crankshaft.

Prior hermetic compressors include counterweights in the rotor end rings having axial steps. These end rings provided the necessary rotor imbalance but agitated oil within the oil sump. Other compressors included counterweights with hollows or holes to provide smooth bottoms trying to prevent oil agitation, but these also had additional parts that added to the cost of the compressor. An example of such a compressor with a separate counterweight shield is shown in U.S. Pat. No. 5,064,356.

A problem arises in the aforementioned hermetic compressors having a rotor equipped with a counterbalance weight adjacent the oil sump, in that the rotating rotor causes turbulence within the housing, which agitates the oil in the oil sump and results in lower quality oil for lubrication purposes. Specifically, turbulence may either displace the oil in the sump so as to cause an interruption of oil being supplied to the bearings, or aerate the oil to a foamy condition. In either case, failure to provide a constant supply of high quality oil may result in damage to the bearings or an inability of the compressor to function properly. The problem is exaggerated in compressors employing centrifugal rather than differential pressure pumping, because the oil flow rates are lower and interruptions in the supply of high quality oil take longer to correct themselves.

Other problems exist in the current method of manufacturing and assembling a rotor and counterweight assembly. Presently, a separately produced counterweight is attached to a separately produced rotor by means of staking, bolts or screws. Other prior art assembly methods include placing the counterweight in a depression formed in the rotor end ring, then attaching the end ring to the rotor. None of the aforementioned assembly and manufacturing methods produce a rotor counterweight assembly in an economical, single step process preventing problems in a production setting.

Prior art assembly methods such as that of Japanese Document No. 61-118,589 show counterweight buried within the rotor. This construction leads to difficulties in alignment of the rotor during assembly since identification of counterweight location is disguised.

While prior art attempts to ensure high quality, placid oil in the oil sump of a hermetic compressor have been somewhat successful, it is desired to provide an improved apparatus for minimizing the turbulence within the compressor housing while greatly simplifying the manufacturing steps necessary for efficient production.

SUMMARY OF THE INVENTION

The present invention overcomes the disadvantages of the above-described prior art hermetic compressors by providing an improved oil turbulence minimizing apparatus having a counterbalance weight die cast inside a rotor end ring, thereby eliminating the need for any additional attachment method therebetween. The apparatus prevents the creation of undesirable turbulence within the compressor housing during compressor operation.

Generally, the invention provides a hermetic compressor comprising a housing having a compressor mechanism, drive mechanism, and oil sump encased therein. The drive mechanism includes a rotor having an axial end adjacent the oil sump, to which an end ring having a smooth surface is connected. The rotor end ring includes a counterweight die cast therein, preventing any portions of the counterweight from protruding from the smooth surface of the end ring. Upon rotation of the rotor, the smooth surface does not create the turbulence ordinarily caused by rotor and counterbalance weight assemblies.

An advantage of the oil turbulence minimizer of the present invention is that turbulence within the housing caused by the rotor and counterbalance weight assembly is substantially eliminated.

Another advantage of the oil turbulence minimizer of the present invention is that a high quality, placid oil supply is maintained in the oil sump for use in lubricating and operating the compressor.

Yet another advantage of the oil turbulence minimizer of the present invention is that the risk of damage to the compressor mechanism bearings and other parts receiving lubricating oil is greatly reduced.

A further advantage of the oil turbulence minimizer of the present invention is that a more reliable solution to reducing turbulence is provided requiring less material and manufacturing cost. By combining the manufacturing of the end ring with attachment of the counterweight, the compressor design is simplified thereby gaining cost and manufacturing efficiencies.

Yet another advantage of the end ring of the present invention, in one form thereof, is that it may be easily incorporated into existing compressor designs having a rotor and counterweight assembly. Counterweight location may be visualized to assist proper assembly and balancing of the compressor.

A further advantage of the oil turbulence minimizer of the present invention is that the dimensions of the compressor need not be changed to accommodate the end ring.

The invention, in one form thereof, provides a hermetic compressor assembly having a housing containing a motor drivingly coupled to a compressor mechanism for compressing refrigerant. The motor has a rotor, having an end ring, rotatable about a vertical axis. A counterbalance weight is die cast within the rotor end ring.

In another form of the invention, a hermetic compressor assembly includes a housing having an oil sump and a motorcompressor unit. The motor-compressor unit is disposed within the housing, having a rotor with a connected end ring and a compressor having a crankshaft coaxially disposed within the rotor. The crankshaft is drivingly engaged by the rotor, and extends from a lower axial end of the rotor into or near the oil sump. The crankshaft including means for drawing oil from said oil sump, for delivery through an oil passageway in the crankshaft, to the compressor for lubrication. A counterbalance weight is die cast within the rotor end ring having an annular body member with eccentric mass with respect to the axis of rotation of the rotor. The end ring includes a central opening through which the crankshaft extends and a generally smooth annular lower surface facing said oil sump, whereby the rotor end ring may operably rotate without causing turbulence and agitation of oil in said oil sump. The counterweight extends through the rotor so a portion may be seen and utilized to properly balance the compressor.

In another form of the invention, a method of manufacturing a rotor end ring includes providing a mold with a cavity having the form of the rotor end ring, inserting a counterweight into the cavity, and then pouring molten metal into the cavity to die cast a rotor end ring about the counterweight. During insertion of the counterweight into the mold, the counterweight is attached by means of an extending portion into a bore in the mold. This prevents the counterweight from moving during the pouring operation. Only enough metal is poured with the mold so as to form the surface layer of the rotor end ring coplanar with the surface of the counterweight.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
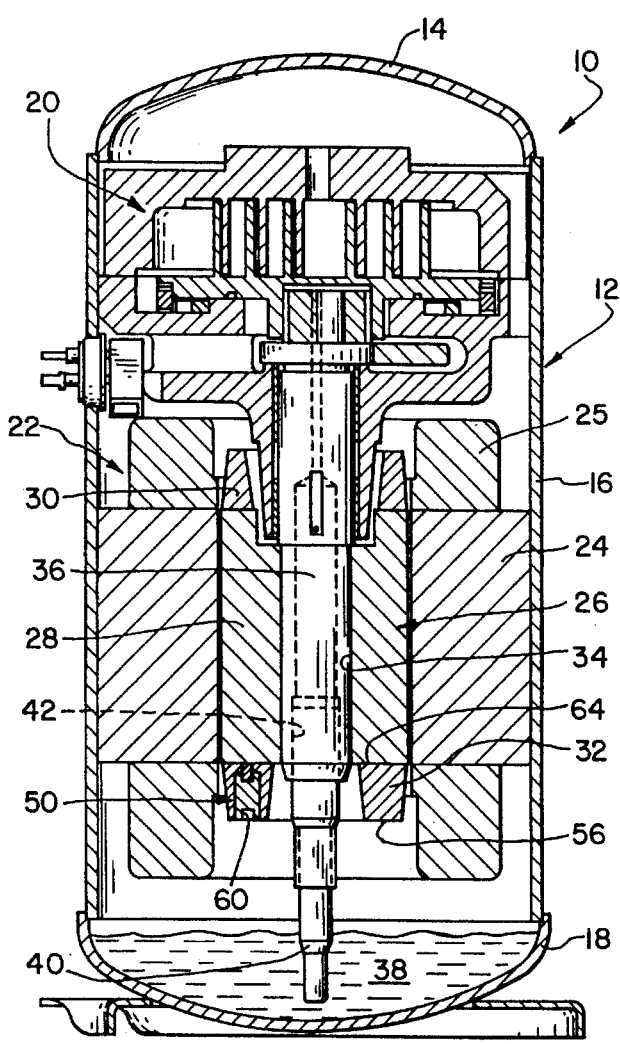
FIG. 1 is a longitudinal sectional view of a compressor, particularly showing one form of a rotor end ring.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

Referring to FIG. 1, there is shown a hermetic compressor to which the present invention is applicable as described hereinafter. U.S. Pat. No. 4,934,905, assigned to the assignee of the present invention, describes in detail a general scroll compressor and is explicitly incorporated herein by reference. Compressor 10 includes a housing 12 comprising a top cover plate 14, a central portion 16 and a bottom portion 18 wherein the housing portions are hermetically joined, as by welding. Disposed within housing 12 is a motor-compressor unit comprising a scroll compressor mechanism 20 and an electric motor 22.

Electric motor 22 includes a stator assembly 24 and rotor assembly 26 that is rotatable about a generally vertical axis. Rotor assembly 26 comprises a laminate central portion 28, a die cast upper end ring 30 and a die cast lower end ring 32.

Central portion 28 has a central aperture 34 provided therein into which is coaxially secured a crankshaft 36 by an interference fit. Accordingly, crankshaft 36 is drivingly engaged by rotor assembly 26, whereby motor 22 provides a drive mechanism for scroll compressor mechanism 20.

Housing 12 includes an oil sump 38 in the bottom thereof, from which oil is supplied to compressor mechanism 20 by means of an oil lubrication system comprising an oil pickup tube 40 and a vertical oil passageway 42 within crankshaft 36.

In order to counterbalance the rotating masses associated with the compressor mechanism, it is desirable to provide at the lower end of crankshaft 36 a counterbalance weight. Prior art counterbalance weights comprised a solid arc portion counterweight attached by means of a screw to a rotor end ring.

Figure 2:
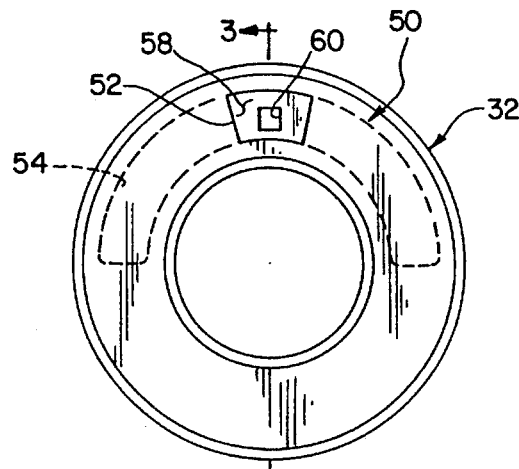
FIG. 2 is a top view of a rotor end ring, in accordance with one embodiment of the present invention.
Figure 3:
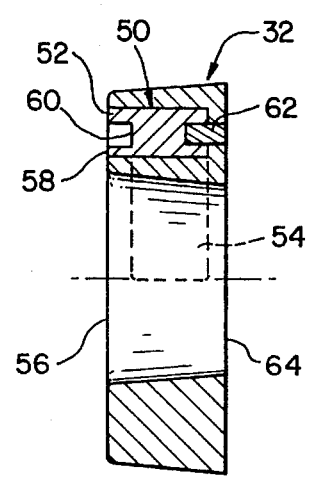
FIG. 3 is a sectional view of the rotor end ring of FIG. 2 taken along line 3—3 and viewed in the direction of the arrows.
Figure 4:
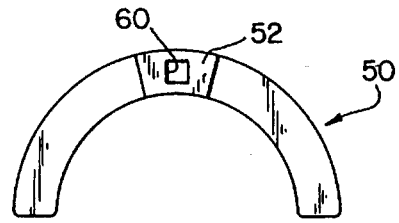
FIG. 4 is a top view of the counterweight utilized with the end ring of FIG. 2.
Figure 5:
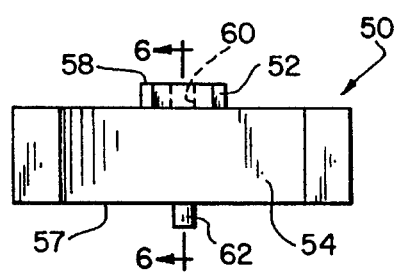
FIG. 5 is an elevational view of the rotor counterweight of FIG. 4.
Figure 6:
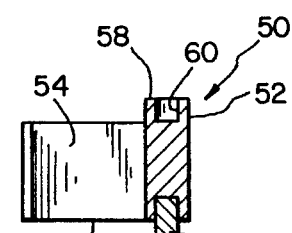
FIG. 6 is a view of the counterweight of FIG. 5 taken along line 6—6 and viewed in the direction of the arrows.

In accordance with the principles of the invention as shown in FIGS. 1–2, compressor 10 includes a counterweight 50 in rotor end ring 32 which were die cast together. As shown in FIGS. 2 and 3, the die cast end ring 32 includes no additional parts or additional attachment method to hold counterweight 50 to end ring 32.

End ring 32, as shown in FIG. 2, includes counterweight 50 integrally die cast as shown in dotted line. This dotted line segment displays the general solid arc body portion of the main counterweight portion 54. An upstanding portion 52 protrudes from main counterweight portion 54 to the bottom surface 56 of end ring 32. Upstanding portion 52 includes a small pad area 58 level with bottom surface 56 to which a counterweight identification and a locator hole 60 may be applied and visualized. Locator hole 60 assists in proper attachment of end ring 32 to central portion 28 during assembly and of rotor assembly 26 to compressor 10. Along top surface 57 of counterweight 50 is an extending portion 62 that extends to the top surface 64 of end ring 32. Extending portion 62 assists in the die casting of end ring 32 by pressing the pad area to the bottom of end ring mold 70 to help ensure pad area 58 is seated against the mold properly.

The preferred embodiment of counterweight 50, as shown in the drawings, is formed from sintered brass having a preferred density of approximately 7.8 g/cm$^3$ to 8.0 g/cm$^3$. Other materials may be equivalently used as long as they have a different density than that of the material used to form end ring 32 and provide the desired mass eccentricity as required by the compressor manufacturer.

Figure 7:
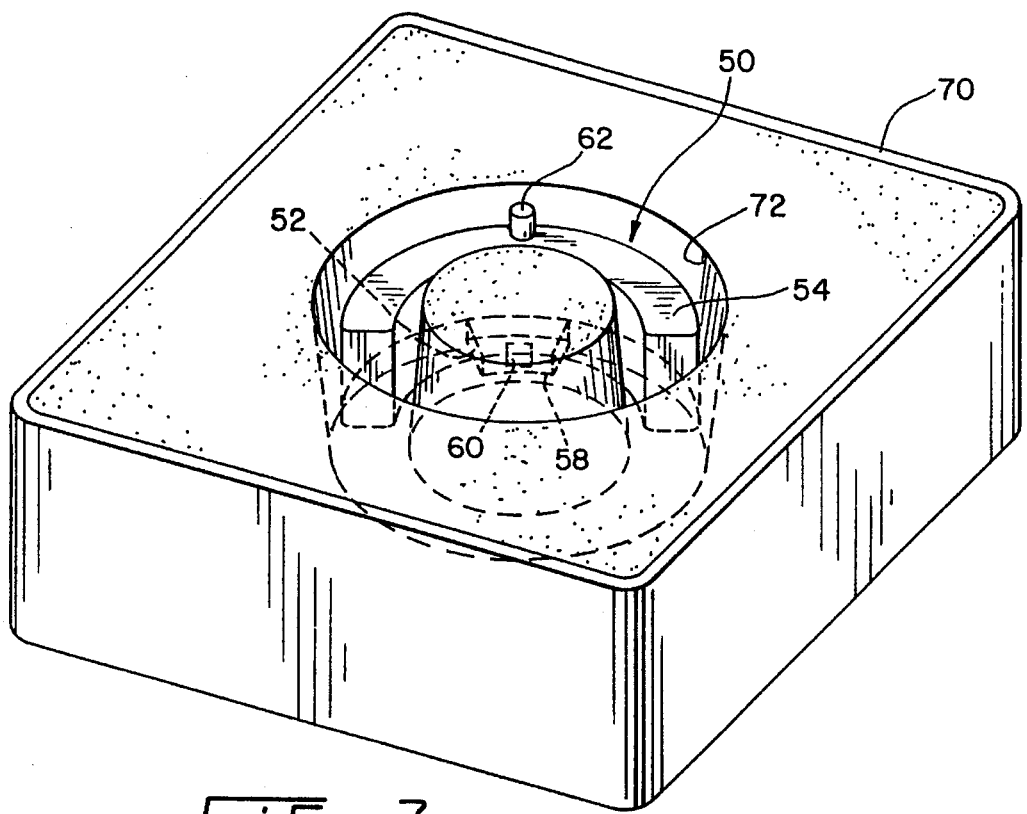
FIG. 7 is a perspective view of a mold utilized in the one form the present invention, with a counterweight disposed therein.
Figure 8:
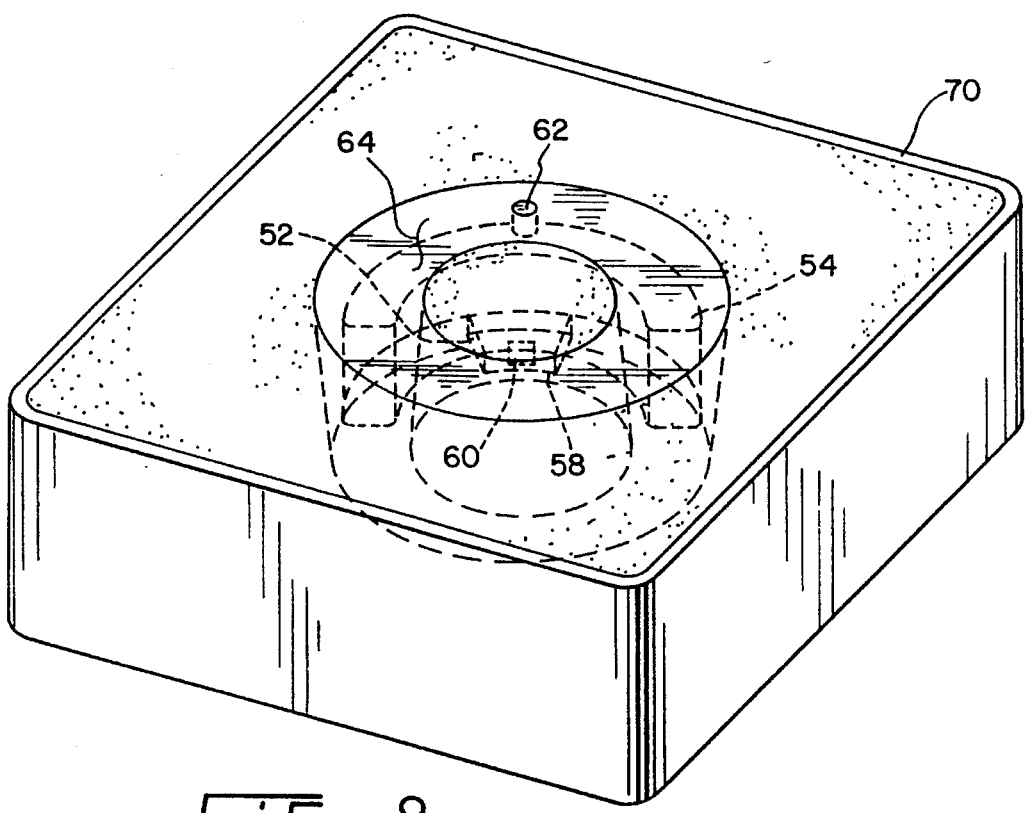
FIG. 8 is a perspective view of a mold utilized in the one form the present invention, with a finished rotor end ring disposed therein.

FIGS. 7 and 8 illustrate a new method of forming end ring 32. As illustrated in FIG. 7, a mold 70 is provided to form rotor end ring 32. A cavity 72 is formed to substantially conform to the dimensions of the finished end ring 32. A counterweight 50 of the present design is placed on a square locator pin located at the base of the mold cavity.

End ring 32 is formed as by die casting by injecting molten metal into cavity 72. Molten metal fills the cavity around the pad area 58 about counterweight 50. As the metal cools within mold 70 it forms a bottom surface 56 of end ring 32 coplanar with pad area 58. Through the use of the square locator hole 60 and the extending portion 62, counterweight 50 is prevented from shifting in position during the die casting operation.

It will be appreciated that the embodiment of the present invention provides a counterbalance weight end ring having a smooth bottom surface 56 facing oil sump 38 while at the same time requiring no additional parts for connection between end ring 32 and counterweight 50. The provision of a generally smooth bottom surface is advantageous in eliminating turbulence caused by rotating rotor assembly 26. The single piece construction of the present invention allows for a dramatic reduction in the cost of motor end ring and counterweight units.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A motor comprising:
   a drive output;
   a stator;
   a rotor rotatably disposed within said stator and attached to said drive output, said rotor having an end ring, said end ring having a top and a bottom surface; and
   a counterbalance weight integrally attached to said end ring by die casting within said rotor end ring, said counterbalance weight having a top and a bottom surface, an upstanding portion extending outwardly from said counterbalance weight bottom surface, and a raised portion extending outwardly from said counterbalance weight top surface and being flush with said end ring top surface, said upstanding portion flush with said end ring bottom surface and defining a guide opening for allowing said rotor and said drive output to be positioned in a desired manner during installation of said motor.

2. A hermetic compressor assembly comprising:
   a housing;
   an oil sump containing oil within said housing;
   a compressor mechanism within said housing for compressing refrigerant;
   a motor within said housing having a drive output drivingly coupled to said compressor mechanism, said motor having a rotatable rotor, said rotor having an end ring, said end ring having a top and a bottom surface; and
   a counterbalance weight integrally attached by die casting within said rotor end ring, said counterbalance weight having a top and a bottom surface, an upstanding portion extending outwardly from said counterbalance weight bottom surface, and a raised portion extending outwardly from said counterbalance weight top surface and being flush with said end ring top surface, said upstanding portion being flush with said end ring bottom surface and defining a guide opening for positioning said rotor during assembly of said compressor assembly.

3. The hermetic compressor assembly of claim 2 in which said end ring includes an axial end surface in said oil sump, said end surface being substantially flat to prevent oil agitation within said oil sump.

4. The hermetic compressor assembly of claim 2 in which said counterweight is visible within said rotor end ring.

5. A hermetic compressor assembly, comprising;
   a housing;
   an oil sump within said housing;
   a motor-compressor unit disposed within said housing, said unit comprising electric motor having a rotor, an end ring connected to said rotor, and a compressor having a crankshaft coaxially disposed within said rotor and drivingly engaged thereby, said crankshaft extending from a lower axial end of said rotor into said oil sump and including means for drawing oil from said oil sump for delivery through an oil passageway in said crankshaft to the compressor for lubrication thereof; and
   a counterbalance weight die cast within said rotor end ring comprising an arc shaped body member having eccentric mass with respect to the axis of rotation of said rotor, said end ring including an upper and a lower surface, a central opening through which said crankshaft extends and a generally smooth annular lower surface facing said oil sump, said counterbalance weight having a top and a bottom surface, an upstanding portion extending outwardly from said counterbalance weight bottom surface and a raised portion extending outwardly from said counterbalance weight top surface and being flush with said end ring upper surface, said upstanding portion being flush with said end ring lower surface and defining a guide opening for positioning said rotor during assembly of said compressor assembly whereby said rotor end ring may operably rotate without causing turbulence and agitation of oil in said oil sump.

6. The hermetic compressor assembly of claim 5 in which said counterweight is visible within said rotor end ring.

* * * * *

UNITED STATES PATENT AND TRADEMARK OFFICE
CERTIFICATE OF CORRECTION

PATENT NO. : 5,476,369
DATED : December 19, 1995
INVENTOR(S) : Jeffrey C. Fowlkes, Gary L. Gilmore It is certified that error appears in the above-indentified patent and that said Letters Patent is hereby corrected as shown below:

Claim 1, column 5, line 43, after "portion" insert --being--.

Claim 5, column 6, lines 43-44, delete "counterbalamce" and substitute therefor --counterbalance--.

Signed and Sealed this

Nineteenth Day of March, 1996

Attest:

BRUCE LEHMAN

*Attesting Officer*     *Commissioner of Patents and Trademarks*